United States Patent
Habib et al.

(10) Patent No.: US 10,151,474 B2
(45) Date of Patent: *Dec. 11, 2018

(54) COUNTERFLOW ION TRANSPORT BOILER SYSTEM

(71) Applicant: KING FAHD UNIVERSITY OF PETROLEUM AND MINERALS, Dhahran (SA)

(72) Inventors: Mohamed Abdel-Aziz Habib, Dhahran (SA); Rached Ben-Mansour, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,518

(22) Filed: Apr. 26, 2018

(65) Prior Publication Data

US 2018/0306433 A1 Oct. 25, 2018

Related U.S. Application Data

(63) Continuation of application No. 15/493,976, filed on Apr. 21, 2017, now Pat. No. 10,018,352.

(51) Int. Cl.
*F22B 1/16* (2006.01)
*F22B 9/12* (2006.01)
(Continued)

(52) U.S. Cl.
CPC ............... *F22B 9/12* (2013.01); *F22B 11/04* (2013.01); *F22D 1/36* (2013.01); *F23D 14/32* (2013.01); *F23L 7/007* (2013.01); *F23L 15/04* (2013.01)

(58) Field of Classification Search
CPC ... C10B 13/0251; C10B 13/0255; F22B 1/16; F23D 14/32
See application file for complete search history.

(56) References Cited

U.S. PATENT DOCUMENTS 5,112,578 A * 5/1992 Murayama ............... B01J 8/062
  252/373
5,820,654 A 10/1998 Gottzman
(Continued)

OTHER PUBLICATIONS

Max Christie, et al., "Advanced Oxyfuel Boilers and Process Heaters for Cost Effective CO$_2$ Capture and Sequestration", Annual Technical Progress Report, Jul. 2006, 23 pages.
(Continued)

*Primary Examiner* — Gregory A Wilson
(74) *Attorney, Agent, or Firm* — Oblon, McClelland, Maier & Neustadt, L.L.P.

(57) ABSTRACT

A fire tube boiler system including a plurality of oxygen transport reactors that heats a working fluid. Each oxygen transport reactor has a first inner tube with an ion transport membrane that receives air from a first supply line, extracts oxygen from the air, and evacuate oxygen depleted air through a first exhaust line, a second inner tube that surrounds the first inner tube that receives the oxygen from the ion transport membrane and a mixture of fuel and carbon dioxide from a second supply line and produces a oxy-combustion, and an peripheral tube that surrounds the second inner tube and evacuates the exhaust gases produced by the oxy-combustion and transfer heat from exhaust gases to the working fluid and the ion transport membrane.

6 Claims, 10 Drawing Sheets

(51) Int. Cl.
*F23D 14/32* (2006.01)
*F22B 11/04* (2006.01)
*F23L 7/00* (2006.01)
*F23L 15/04* (2006.01)
*F22D 1/36* (2006.01)

(56) References Cited

U.S. PATENT DOCUMENTS

| | | | |
|---|---|---|---|
| 5,820,655 A * | 10/1998 | Gottzmann | B01D 53/22 |
| | | | 95/54 |
| 6,139,810 A | 10/2000 | Gottzmann et al. | |
| 6,293,084 B1 * | 9/2001 | Drnevich | B01D 53/22 |
| | | | 60/39.17 |
| 6,394,043 B1 | 5/2002 | Bool, III et al. | |
| 6,565,632 B1 | 5/2003 | Van Hassel et al. | |
| 7,125,528 B2 | 10/2006 | Bool, III | |
| 7,160,357 B2 | 1/2007 | Gottzmann | |
| 8,590,490 B2 | 11/2013 | Habib et al. | |
| 9,004,909 B2 | 4/2015 | Ghoniem et al. | |
| 9,383,096 B2 | 7/2016 | Habib et al. | |
| 9,561,958 B2 | 2/2017 | Quintero | |
| 9,574,496 B2 | 2/2017 | Fadde | |
| 2007/0175411 A1 | 8/2007 | Morin | |
| 2014/0284299 A1 | 9/2014 | Barber et al. | |

OTHER PUBLICATIONS

Mohamed A. Habib, et al., "Design of an ion transport membrane reactor for application in fire tube boilers", Energy, Jan. 2015, pp. 1-15.

Rached Ben-Mansour, et al., "Investigation of performance of fire-tube boilers integrated with ion transport membrane for oxy-fuel combustion: Fire-tube boilers integrated with ITM for oxy-fuel combustion", International Journal of Energy Research, vol. 40, No. 12, Oct. 2016, 1 page (Abstract only).

* cited by examiner

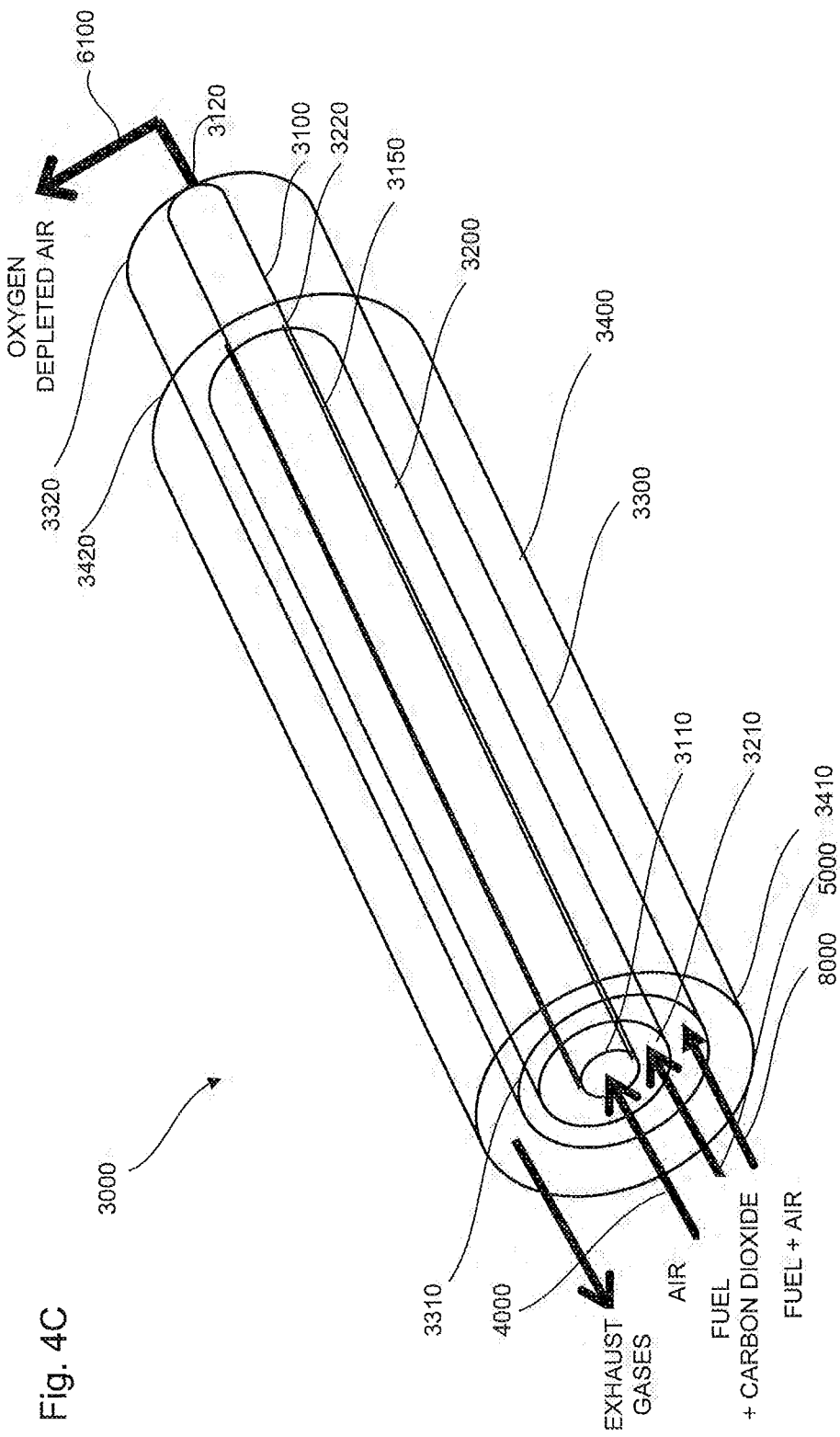

COUNTERFLOW ION TRANSPORT BOILER SYSTEM

CROSS-REFERENCE TO RELATED APPLICATION

The present application is a Continuation of Ser. No. 15/493,976, pending, having a filing date of Apr. 21, 2017.

BACKGROUND

Field of the Disclosure

The present disclosure relates to a fire tube boiler system including ion transport membranes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Energy consumptions continue to rise, thus producing more emissions of carbon dioxide $CO_2$ [Olajire AA, carbon dioxide $CO_2$ capture and separation technologies for end-of-pipe applications-a review, Energy, 2010, 35, 2610-2628]. Carbon dioxide $CO_2$ capture from point source emissions has been recognized as one of several strategies necessary for mitigating the unfettered release of greenhouse gases (GHGs) into the atmosphere. To keep GHGs at manageable levels, a drastic reduction in carbon dioxide $CO_2$ emissions may be needed through capturing and separation [Perry S, Klemeš J, Bulatov I. Integrating waste and renewable energy to reduce the carbon footprint of locally integrated energy sectors, Energy, 2008, 33, 1489-1497]. World population growth and the consequent rise in pollution and greenhouse gases emissions are among the challenging problems that the scientific community must solve in the near future [Amelio M, Morrone P, Gallucci F, Basile A. Integrated gasification gas combined cycle plant with membrane reactors: Technological and economical analysis, Energy Conversion and Management, 2007, 48, 2680-2693]. The energy production from fossil fuel sources represents a large portion (about 65%) of the total greenhouse gases emissions (carbon dioxide $CO_2$, methane $CH_4$ and nitrogen oxide $N_2O$) [Cumo M, Santi F, Simboletti G. Energia, cambiamenti climaticie sequestro dell'anidride carbonica, La Termotecnica, 2003, 33-43]. Most scientists agree that there is a strong connection between climate change and the anthropogenic emissions of greenhouse gases, of which carbon dioxide $CO_2$ is by far the most important gas in terms of the amount emitted. Carbon dioxide $CO_2$ is the major atmospheric contaminant leading to a temperature increase due to the greenhouse effect. The scientific community considers the anthropogenic carbon dioxide $CO_2$ emission needed to maintain the existing world climate condition. As a result, radical changes in fossil fuel-operated technologies are needed.

Oxy-combustion is among one of the most promising carbon dioxide $CO_2$ capture technologies. Accordingly, a hydrocarbon fuel is burned in a nearly pure oxygen atmosphere, or in a nitrogen-free atmosphere. The products of the combustion consist of a mixture of only carbon dioxide $CO_2$ and water $H_2O$ vapor [Nemitallah, M. A., Habib, M. A., Ben-mansour, R., Ghoniem, A. F., Design of an ion transport membrane reactor for gas turbine combustion application, Journal of membrane science, 2014, 450, 60-71]. Water $H_2O$ vapor can easily be condensed and the resulting carbon dioxide $CO_2$ can be captured for industrial purposes, or it can be stored. Although this technology is applicable to conventional combustion system it needs an oxygen-separating system, wherein oxygen is separated from air or another oxygen-containing stream. Having an oxygen-separating system as a separate unit for removing undesired substances in oxy-combustion consumes a portion of the output power generated by the conventional combustion system [Haslbeck, J., Capicotto, P., Juehn, N., Lewis, E., Rutkowski, M., Woods, M., et al., bituminous coal to electricity, Washington D.C., DOE/NETL-1291, 2007]. Therefore, utilizing the oxygen-separating system in a combustion system may not be an efficient way to turn a combustion system into an oxy-combustion system.

A new approach for oxy-combusting a fuel has been recently disclosed via the use of ion transport membrane reactors (OTMR). In these reactors, oxygen is separated from a gaseous mixture (generally air) at a temperature ranging from 650° C. to 950° C., and a fuel is oxy-combusted in the presence of the separated oxygen [Ahmed, P., Habib, M. A., Ben-Mansour, R., Kirchen, P., Ghoniem, A. F., CFD (computational fluid dynamics) analysis of a novel reactor design using ion transport membranes for oxy-fuel combustion, Energy, 2014, 77, 932-944]. Alternatively, fuel can also be burned in the presence of the separated oxygen and recycled carbon dioxide $CO_2$, in the permeate side of the membrane. Several membrane materials were shown to effectively separate oxygen from a gaseous mixture. Among those, lanthanum cobaltite perovskite ceramics, modified proviskite ceramics [Balachandran, U., Kleefisch, M. S., Kobylinski, T. P., Morissette, S. L., Pei, S., Oxygen ion-conducting dense ceramic membranes, US patent, 1997, 5, 639-437], brownmillerite structured ceramics [Schwartz, M., White, J. H., Sammels, A. F., Solid state oxygen anion and electron mediating membrane and catalytic membrane reactors containing them, US patent, 2000, 6, 033-632], ceramic metal dual phase membranes [Chen, C. C., Prasad, R., Gottzmann, C. F., Solid electrolyte membrane with porous catalytically-enhancing constituents (assigned to praxair technology), US patent, 1999, 5, 938-822], and thin duel phase membranes, which consists of chemically stable yttria-stabilized zirconia (YSZ), [Kim, J., Lin, Y. S., Synthesis and oxygen permeation properties of thin YSZ/Pd composite membranes, AIChE Journal, 2000, 46, 1521] have been comprehensively investigated.

In view of the forgoing, one objective of the present disclosure is to provide a fire tube boiler system including oxygen transport reactors to heat a working fluid, via oxy-combustion, and to generate power through the working fluid and to capture and/or recycle carbon dioxide $CO_2$. In one aspect of the present disclosure the oxygen transport reactors include a plurality of ion transport membranes, wherein each separates molecular oxygen from a gaseous mixture exposed thereon.

Another objective of the present disclosure is to provide recycled heat and/or supplementary heat to the plurality of ion transport membranes of one or more oxygen transport reactors to enhance oxygen separation selectivity and thus enhance efficiency of the fire tube boiler system.

BRIEF SUMMARY OF THE INVENTION

According to a first aspect the present disclosure relates to a fire tube boiler system. The fire tube boiler system includes a vessel that contains a working fluid, a plurality of oxygen transport reactors positioned inside the vessel that heats the working fluid, a first supply line that provides air to the plurality of oxygen transport reactors, a second supply line that provides a mixture of fuel and carbon dioxide to the plurality of oxygen transport reactors, a first exhaust line that evacuates oxygen depleted air from the plurality of oxygen transport reactors, and a second exhaust line that evacuates exhaust gases from the plurality of oxygen transport reactors. Each oxygen transport reactor of the plurality of oxygen transport reactors includes a first inner tube having an upstream end that connects the first supply line to receive the air, a downstream end that connects the first exhaust line to evacuate the oxygen depleted air, and an ion transport membrane that connects the upstream end with the downstream end to extract oxygen from the air and leave the oxygen depleted air, a second inner tube that surrounds the first inner tube to receive the oxygen from the ion transport membrane and that connects the second supply line to receive the mixture of fuel and carbon dioxide to react with the oxygen in a oxy-combustion, and an peripheral tube that surrounds the second inner tube and connects the second exhaust line through an upstream end to evacuate the exhaust gases produced by the oxy-combustion and transfer heat from exhaust gases to the working fluid and the ion transport membrane.

According to a second aspect the present disclosure relates to a fire tube boiler system. The fire tube boiler system includes a vessel that contains a working fluid, a plurality of oxygen transport reactors positioned inside the vessel that heats the working fluid, a first supply line that provides air to the plurality of oxygen transport reactors, a second supply line that provides a mixture of fuel and carbon dioxide to the plurality of oxygen transport reactors, a third supply line that provides a supplementary mixture of fuel and air to the plurality of oxygen transport reactors, a first exhaust line that evacuates oxygen depleted air from the plurality of oxygen transport reactors, and a second exhaust line that evacuates exhaust gases from the plurality of oxygen transport reactors. Each oxygen transport reactor of the plurality of oxygen transport reactors includes a first inner tube with an upstream end that connects the first supply line to receive the air, a downstream end that connects the first exhaust line to evacuate the oxygen depleted air, and an ion transport membrane that connects the upstream end with the downstream end to extract oxygen from the air and leave the oxygen depleted air, a second inner tube that surrounds the first inner tube to receive the oxygen from the ion transport membrane and that connects the second supply line to receive the mixture of fuel and carbon dioxide to react with the oxygen in a oxy-combustion, a third inner tube that connects the third supply line to provide a supplementary combustion and that surrounds the second inner tube to provide heat to the ion transport membrane, and an peripheral tube that surrounds the third inner tube and connects the second exhaust line through an upstream end to evacuate the exhaust gases produced by the oxy-combustion and transfer heat from exhaust gases to the working fluid and the ion transport membrane.

According to a third aspect the present disclosure relates to a fire tube boiler system. The fire tube boiler system includes a vessel that contains a working fluid, a plurality of oxygen transport reactors positioned inside the vessel that heats the working fluid, a first supply line that provides air to the plurality of oxygen transport reactors, the first supply line having supplementary ion transport membranes, a second supply line that provides a mixture of fuel and carbon dioxide to the plurality of oxygen transport reactors, a third supply line that provides a supplementary mixture of fuel and air to the plurality of oxygen transport reactors, a first exhaust line that evacuates oxygen depleted air from the plurality of oxygen transport reactors, a second exhaust line that evacuates exhaust gases from the plurality of oxygen transport reactors. Each oxygen transport reactor of the plurality of oxygen transport reactors includes a first inner tube with an upstream end that connects the first supply line to receive the air, a downstream end that connects the first exhaust line to evacuate the oxygen depleted air, and an ion transport membrane that connects the upstream end with the downstream end to extract oxygen from the air and leave the oxygen air depleted, a second inner tube that surrounds the first inner tube to receive the oxygen from the ion transport membrane and that connects the second supply line to receive the mixture of fuel and carbon dioxide to react with the oxygen in a oxy-combustion, a third inner tube that connects the third supply line to receive oxygen and provide a supplementary oxy-combustion and that surrounds the second inner tube to provide heat to the ion transport membrane, and an peripheral tube that surrounds the third inner tube and connects the second exhaust line through an upstream end to evacuate the exhaust gases produced by the oxy-combustion and the supplementary oxy-combustion and transfer heat from exhaust gases to the working fluid and the ion transport membrane.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4C is a perspective view of an oxygen transport reactor of the fire tube boiler system in the first supplementary configuration, according to certain aspects of the disclosure;

DETAILED DESCRIPTION

Figure 1:
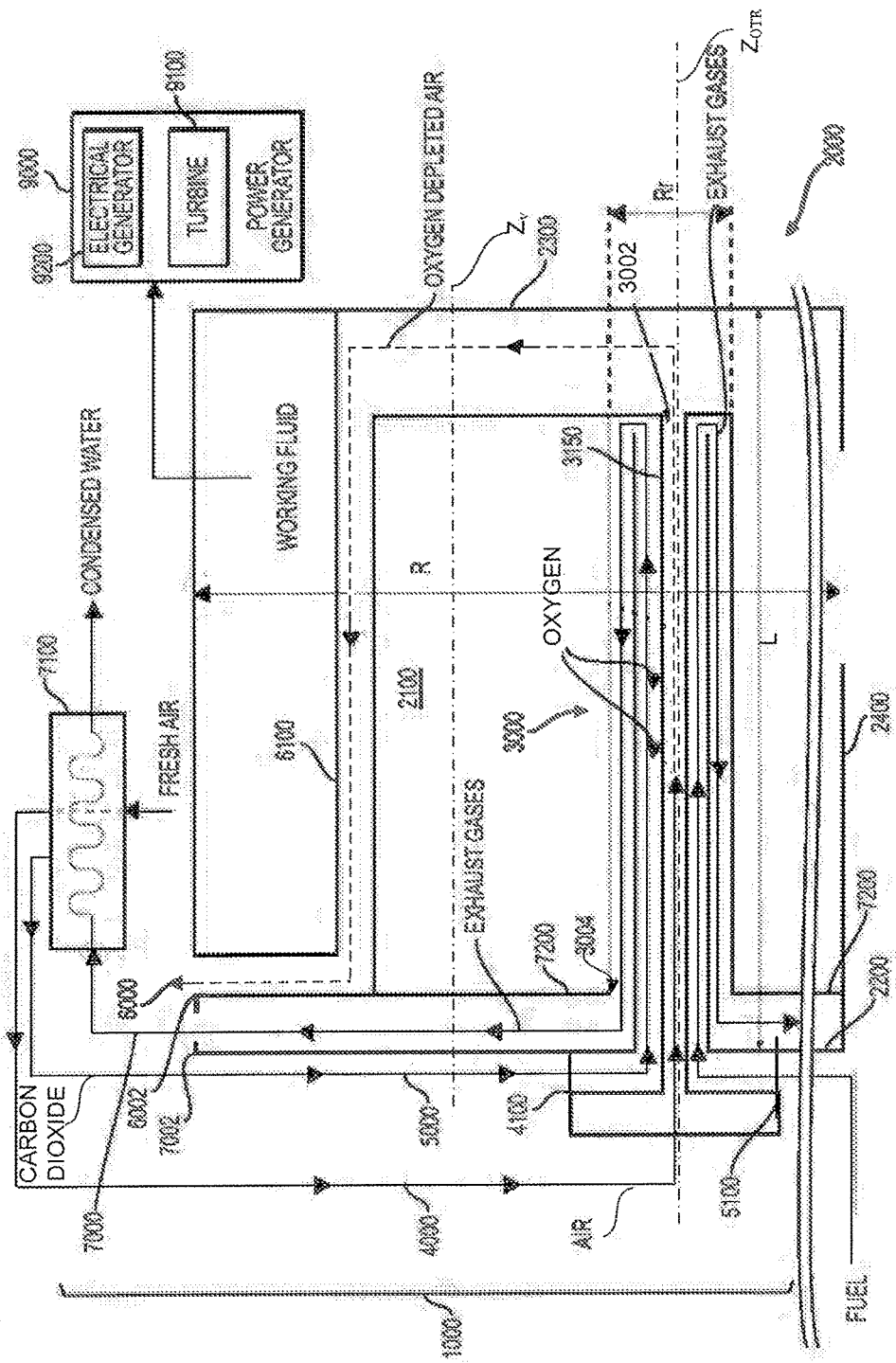
FIG. 1 is a schematic view of a fire tube boiler system, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a schematic view of a fire tube boiler system 1000, according to certain aspects of the disclosure.

The fire tube boiler system 1000 can include a vessel 2000 that contains a working fluid, e.g. water $H_2O$, a plurality of oxygen transport reactors 3000 positioned inside the vessel 2000 that heats the working fluid, a first supply line 4000 that provides air to the plurality of oxygen transport reactors 3000, a second supply line 5000 that provides a mixture of fuel and carbon dioxide (e.g., $CH_4+CO_2$), to the plurality of oxygen transport reactors 3000, a first exhaust line 6000 that evacuates oxygen depleted air, e.g. dinitrogen $N_2$, from the plurality of oxygen transport reactors 3000, and a second exhaust line 7000 that evacuates exhaust gases, e.g., carbon dioxide $CO_2$ and water $H_2O$, from the plurality of oxygen transport reactors 3000.

In addition, the fire tube boiler system 1000 can include a condenser 7100 between the second exhaust line 7000 and the second supply line 5000. The condenser 7100 can exchange heat between the exhaust gases and air outside the vessel 2000 to cool the exhaust gases and condense the water $H_2O$ present in the exhaust gases to extract and/or separate carbon dioxide $CO_2$ from exhaust gases such as water. The extracted carbon dioxide $CO_2$ can be stored or sent back to the second supply line 5000 where the extracted carbon dioxide $CO_2$ can be reinjected into the fire tube boiler system 1000 through the second supply line 5000.

The storage of the carbon dioxide $CO_2$ can be performed by sequestering the carbon dioxide $CO_2$ in storage sites, e.g. oil fields, gas fields, saline formations, unminable coal seams, and saline-filled basalt formations, via geo-sequestration techniques, enhanced oil recovery techniques, ocean sequestration techniques, and/or mineral sequestration techniques.

The plurality of oxygen transport reactors 3000 can rely on a plurality of ion transport membranes 3150 to separate oxygen $O_2$ from the air supplied by the first supply line 4000 and to evacuate oxygen depleted air through the first exhaust line 6000. The oxygen $O_2$ extracted by the plurality of ion transport membranes 3150 is then used to react with the mixture of fuel and carbon dioxide (e.g., $CH_4+CO_2$) supplied by the second supply line 5000 in an oxy-combustion that provides the exhaust gases containing substantially only carbon dioxide $CO_2$ and water $H_2O$ vapor. The carbon dioxide $CO_2$ contained in the exhaust gases can be separated from the water $H_2O$ through the condenser 7100 to be stored and/or reinjected into the fire boiler system 1000 via the second supply line 5000.

Consequently, the fire boiler system 1000 can provide storage and/or recycling of carbon dioxide $CO_2$ emitted from the oxy-combustion used to heat the working fluid.

In addition, the fire tube boiler 1000 can be coupled to a power generator 9000 that extracts and converts heat from the working fluid into energy. For example, the power generator 9000 can include a turbine 9100, and an electrical generator 9200 driven by the turbine 9100. The turbine 9100 can receive the working fluid, e.g. in the form of steam when the working fluid is water $H_2O$ and is heated above the boiling point, and drive the electrical generator 9200 to produce electricity.

Figure 2:
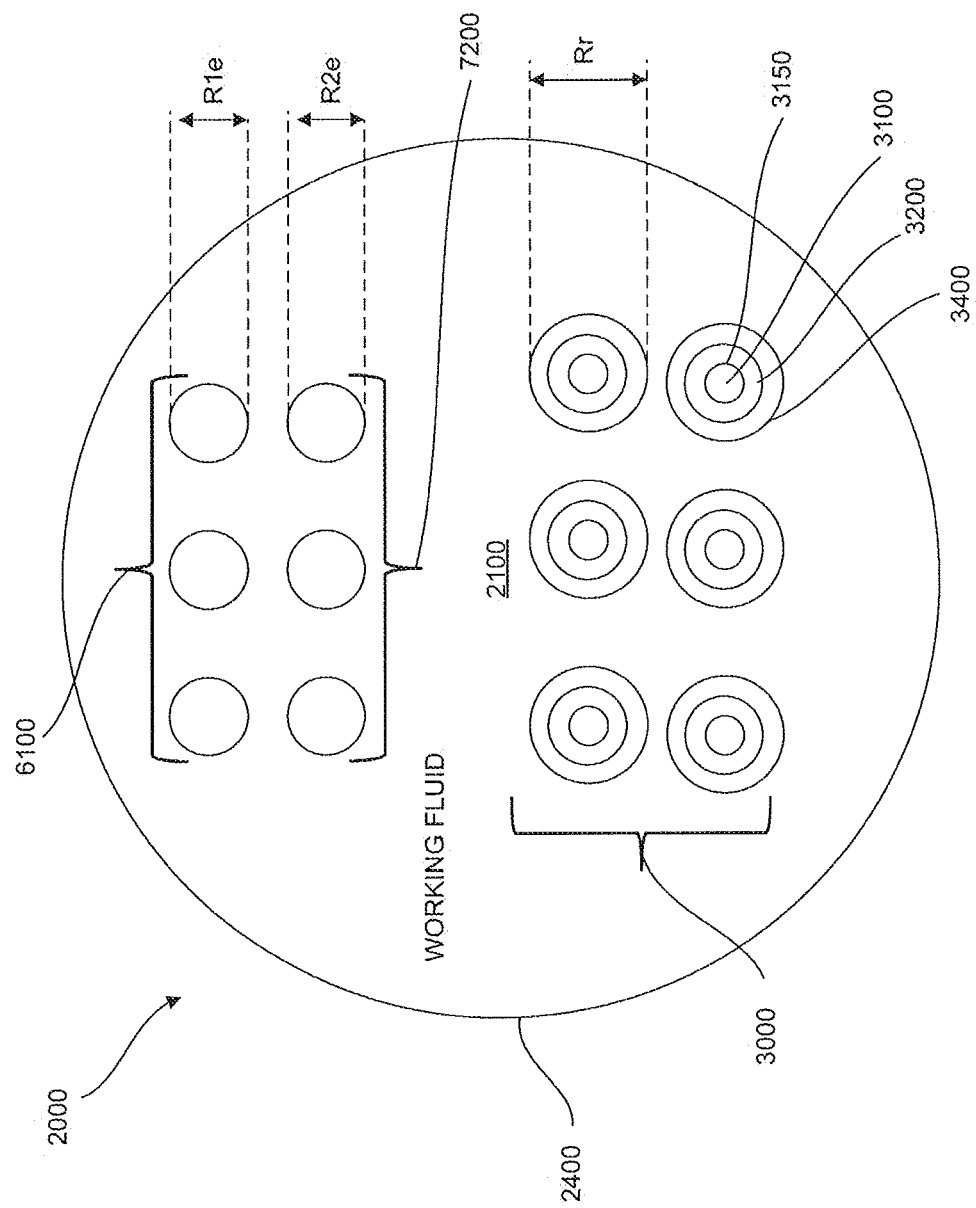
FIG. 2 is a cross sectional view of a vessel of the fire tube boiler system, according to certain aspects of the disclosure.

FIG. 2 is a cross sectional view of a vessel 2000 of the fire tube boiler system 1000, according to certain aspects of the disclosure.

The vessel 2000 can refer to a compartment having a vessel internal cavity 2100 to contain the working fluid, the plurality of oxygen transport reactors 3000 that are surrounded by the working fluid, a plurality of first exhaust ducts 6100, as illustrated in FIG. 1, to evacuate the oxygen depleted air from the plurality of oxygen transport reactors 3000 to the first exhaust line 6000, as illustrated in FIG. 1, and a plurality of second exhaust ducts 7200, as illustrated in FIG. 1, to evacuate the exhaust gases from the plurality of oxygen transport reactors 3000 to the second exhaust line 7000, as illustrated in FIG. 1.

The connection between the plurality of oxygen transport reactors 3000 and the first exhaust line 6000 is established by the plurality of first exhaust ducts 6100 that provides passage from a plurality of downstream outlets 3002, as illustrated in FIG. 1, of the plurality of oxygen transport reactors 3000 to a first exhaust outlet 6002, as illustrated in FIG. 1, of the first exhaust line 6000 to evacuate the oxygen depleted air from the plurality of oxygen transport reactors 3000. Each first exhaust duct of the plurality of first exhaust ducts 6100 connects a respective downstream outlet of the plurality of downstream outlets 3002 to the first exhaust line 6000, as illustrated in FIG. 1.

The connection between the plurality of oxygen transport reactors 3000 and the second exhaust line 7000 is established by the plurality of second exhaust ducts 7200 that provides passage from a plurality of upstream outlets 3004, as illustrated in FIG. 1, of the plurality of oxygen transport reactors 3000 to a second exhaust outlet 7002, as illustrated in FIG. 1, of the second exhaust line 7000 to evacuate exhaust gases from the plurality of oxygen transport reactors 3000. Each second exhaust duct of the plurality of second exhaust ducts 7200 connects a respective upstream outlet of the plurality of upstream outlets 3004 to the second exhaust line 7000.

The vessel 2000 can contain the working fluid at moderate temperatures and pressures, preferably, at a temperature in the range of 50-600° C., more preferably 100-500° C., even more preferably 100-400° C. The vessel 2000 can hold the working fluid at moderate pressures in the range of 1-10 bars, preferably 1-5 bars, more preferably 1-2 bars. The vessel 2000 can be made of a metal or an alloy such as stainless steel, nickel steel, chromium steel, aluminum, aluminum alloy, copper and copper alloys, titanium, and the like, and an interior surface of the vessel 2000 may be coated with an oxidation resistant layer to minimize internal surface oxidation. For example, the interior surface of the vessel 2000 may be coated with the high-temperature duty ceramic composite, quartz, alumina, Pyrex®, and the like. Although the materials used to construct the vessel 2000 are not meant to be limiting and various other materials may also be used.

In some alternative non-limiting illustrative examples, the vessel 2000 can be cylindrical with the vessel internal cavity 2100 having a volume in the range of 0.01-50 $m^3$, or preferably 0.1-20 $m^3$, or preferably 1-10 $m^3$, or preferably 1-5 $m^3$. Accordingly, the vessel 2000 can have a length (L), and a radius (R), wherein the length-to-radius ratio (i.e. L/R) can be in the range of 1-20, preferably 1-10, more preferably 1-5. According to this non-limiting illustrative example, the vessel 2000 can have a longitudinal axis $Z_v$ parallel to a ground surface, as illustrated in FIG. 1. In a preferred non-limiting illustrative example, the vessel 2000 can be rectangular and be vertically or preferably horizontally oriented. For example, the vessel 2000 can be a portion of a duct. The vessel 2000 may also have other geometries including, but not limited to, parallelepipedic, spherical, oblong, conical, and pyramidal.

In some preferred non-limiting illustrative examples, the vessel 2000 can be rectangular or preferably cylindrical with a vessel first end 2200 and a vessel second end 2300 spaced apart by a vessel external wall 2400 that defines the vessel internal cavity 2100, as illustrated in FIG. 1.

In some non-limiting illustrative examples, the vessel first end 2200 can receive the first supply line 4000, the second supply line 5000, the first exhaust line 6000, and/or the second exhaust line 7000. The vessel external wall 2400 can have an opening, waste gate, and/or pressure gate to provide exit to hot and/or vaporized working fluid while the vessel second end 2300 can be closed, as illustrated in FIG. 1.

Each oxygen transport reactor of the plurality of the oxygen transport reactors 3000 has a longitudinal axis $Z_{OTR}$ which is substantially parallel to the longitudinal axis $Z_v$ of the vessel 2000 and run along a longitudinal length of the vessel 2000, as illustrated in FIG. 1.

The plurality of the oxygen transport reactors 3000 can be disposed in various arrangements relative to each other. For example, in one non-limiting illustrative example, the plurality of the oxygen transport reactors 3000 is disposed such that a cross-section of the fire tube boiler system 1000 has an arrangement as depicted in FIG. 2.

In another non-limiting illustrative example, the plurality of the oxygen transport reactors 3000 are equally spaced apart from each other having a square, rectilinear, trapezoidal or a triangular arrangement. Furthermore, the plurality of the oxygen transport reactors 3000 can be equally spaced apart from each other with a randomly arranged configuration.

Preferably, at least 5, more preferably at least 10, but no more than 50 oxygen transport reactors 3000 are disposed inside the vessel 2000 with a reactor external diameter Rr of at least 30 mm, preferably at least 54 mm, and more preferably 66 mm.

Respectively, at least 5, more preferably at least 10, but no more than 50 first exhaust ducts 6100 are disposed inside the vessel 2000 with a first exhaust external diameter R1e of at least 10 mm, preferably at least 18 mm, more preferably 22 mm.

In addition, the plurality of first exhaust ducts 6100 can have an internal arrangement inside the vessel 2000 to further enhance heating of the working fluid by transferring heat carried by the oxygen depleted air to the working fluid before the oxygen depleted air exits the vessel 2000.

The internal arrangement of the plurality of first exhaust ducts 6100 can force the oxygen depleted air to circulate inside the vessel internal cavity 2000 to enhance contact surface between the working fluid and the plurality of first exhaust ducts 6100 and thus transfer heat, e.g. through conduction and/or radiation, from the oxygen depleted air to the working fluid.

For example, the plurality of first exhaust ducts 6100 can have portions with a longitudinal arrangement, as illustrated in FIG. 2, and/or a transverse arrangement, as illustrated in FIGS. 1-2. Through the longitudinal arrangement and/or the transverse arrangement, portions of the plurality of first exhaust ducts 6100 can longitudinally extend from the vessel second end 2300 to the vessel first end 2200 and/or transversely extend along the first vessel end 2200 to enhance surface contact between the working fluid and the plurality of the first exhaust ducts 6100 and thus transfer heat from the oxygen depleted air to the working fluid before the oxygen depleted air exits the vessel 2000.

Respectively, at least 5, more preferably at least 10, but no more than 50 second exhaust ducts 7200 are disposed inside the vessel 2000 with a second exhaust external diameter R2e of at least 20 mm, preferably at least 36 mm, more preferably 44 mm.

Similarly to the plurality of first exhaust ducts 6100, the plurality of second exhaust ducts 7200 can have an internal arrangement inside the vessel 2000 to further enhance heating of the working fluid by transferring heat carried by the exhaust gases to the working fluid before the exhaust gases exit the vessel 2000.

The internal arrangement of the plurality of second exhaust ducts 7200 can force the exhaust gases to circulate inside the vessel internal cavity 2000 to enhance contact surface between the working fluid and the plurality of second exhaust ducts 7200 and thus transfer heat, e.g. through conduction and/or radiation, from the exhaust gases to working fluid.

For example, the plurality of second exhaust ducts 7200 can have portions with a longitudinal arrangement, as illustrated in FIG. 2, and/or a transverse arrangement, as illustrated in FIG. 1. Through the longitudinal arrangement and/or the transverse arrangement, portions of the plurality of second exhaust ducts 7200 can longitudinally extend from the vessel second end 2300 to the vessel first end 2200 and/or transversely extend along the first vessel end 2200 to enhance surface contact between the working fluid and the plurality of the second exhaust ducts 7200 and thus transfer heat from the exhaust gases to the working fluid before the exhaust gases exit the vessel 2000.

Figure 3A:
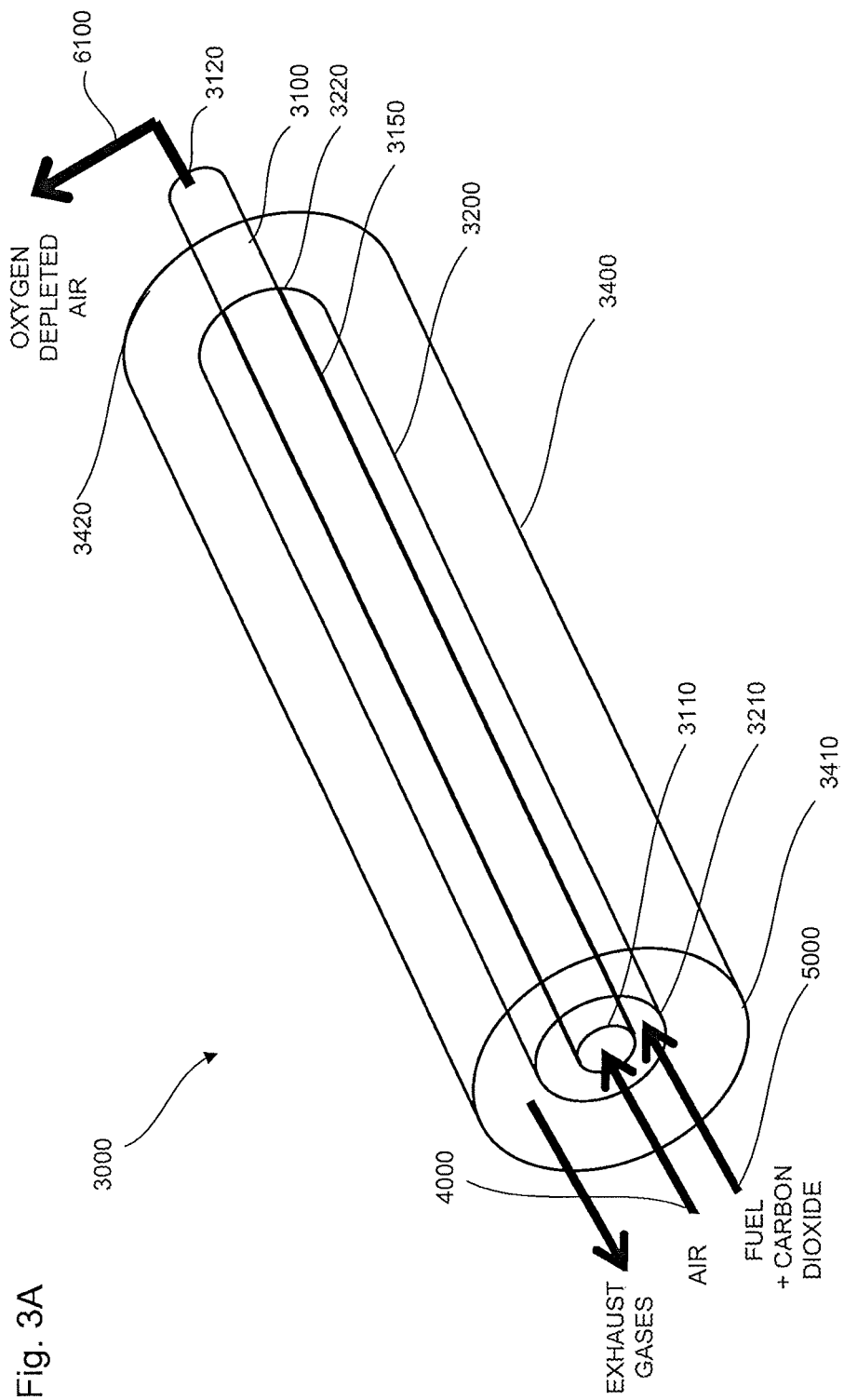
FIG. 3A is a perspective view of an oxygen transport reactor of the vessel, according to certain aspects of the disclosure.
Figure 3B:
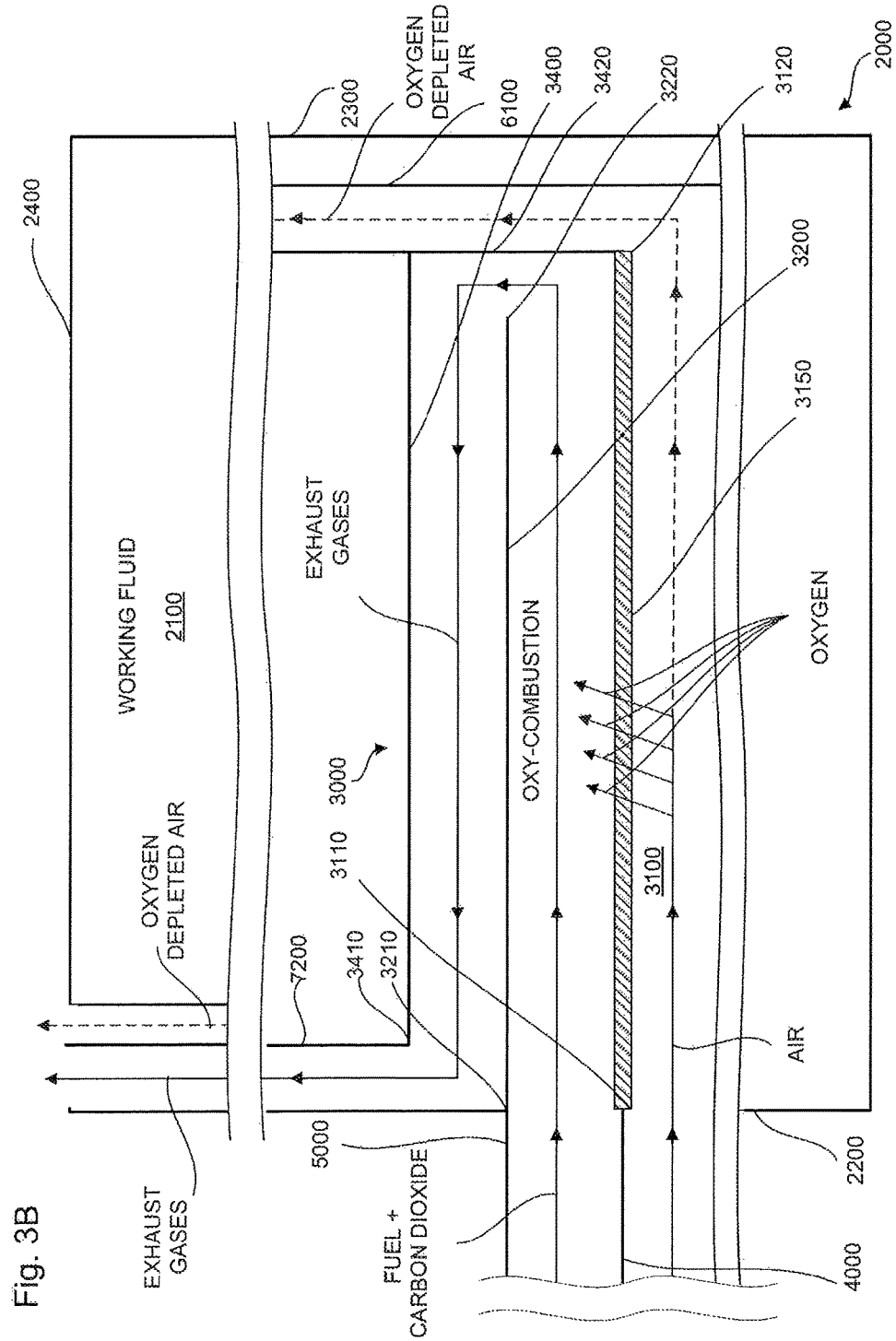
FIG. 3B is a cross sectional view of the oxygen transport reactor of the vessel, according to certain aspects of the disclosure.

FIGS. 3A-3B are a perspective view and a cross sectional view of an oxygen transport reactor 3000 of the vessel 2000, according to certain aspects of the disclosure.

Each oxygen transport reactor of the plurality of oxygen transport reactors 3000 can include a first inner tube 3100 with the ion transport membrane 3150 that connects the first supply line 4000, as illustrated in FIGS. 1, 3A-3B, to a respective first exhaust duct of the plurality of first exhaust ducts 6100, as illustrated in FIGS. 1, 3A-3B, a second inner tube 3200 that surrounds the first inner tube 3100 to receive oxygen $O_2$ from the ion transport membrane 3150 and that connects the second supply line 5000, as illustrated in FIGS. 1, 3A-3B, to receive the mixture of fuel and carbon dioxide $CH_4+CO_2$ and produce the oxy-combustion inside the first inner tube 3100 of the oxygen transport reactor 3000, and an peripheral tube 3400 that connects the second inner tube 3200 to a respective second exhaust duct of the plurality of second exhaust ducts 7200 to evacuate the exhaust gases produced by the oxy-combustion and to transfer heat from the exhaust gases to the working fluid.

In addition to transferring heat to the working fluid, the exhaust gases that circulate between the peripheral tube 3400 and the second inner tube 3200 can transfer heat to the ion transport membrane 3150 via conduction and/or radiation that goes from an internal volume between the peripheral tube 3400 and the second inner tube 3200 to the ion transport membrane 3150.

In some non-limiting illustrative examples, the first inner tube 3100, the second inner tube 3200, and the peripheral tube 3400 are placed concentrically to each other.

The first inner tube 3100 can include a first upstream end 3110 opened to the first supply line 4000 and a first downstream end 3120 opened to the respective first exhaust duct 6100. The second inner tube 3200 can include a second upstream end 3210 opened to the second supply line 5000 and aligned with the first upstream end 3110, and a second downstream end 3220 connected to the peripheral tube 3400. The peripheral tube 3400 can include an outer upstream end 3410 opened on the respective second exhaust duct 7200 and aligned with the second upstream end 3210, and an outer downstream end 3420 facing the second downstream end 3220 and closed to connect internal volumes of the second inner tube 3200 and the peripheral tube 3400.

Air supplied by the first supply line 4000 can be distributed via an air supply manifold 4100, as illustrated in FIG. 1, to each first inner tube 3100. Oxygen $O_2$ can be separated from air at an inner surface of the ion transport membrane 3150 and the separated oxygen $O_2$ can cross the ion transport membrane 3150 to reach an external surface of the ion transport membrane 3150. Oxygen depleted air can then be evacuated to the first exhaust line 6000 via the plurality of first exhaust ducts 6100, as illustrated in FIGS. 1, 3A-3B. The plurality of the first exhaust ducts 6100 can circulate back from the vessel second end 2300 to the vessel first end 2200 to transfer heat, via conduction and/or radiation, from the oxygen depleted air to the working fluid.

The mixture of fuel and carbon dioxide (e.g., $CH_4+CO_2$) supplied by the second supply line 5000 can be distributed via a fuel supply manifold 5100, as illustrated in FIG. 1, to each oxygen transport reactor 3000 to flow through each second inner tube 3200 and along the external surface of the ion transport membrane 3150 and burn the separated oxygen $O_2$ in the oxy-combustion that produces the exhaust gases containing only carbon dioxide $CO_2$ and water $H_2O$ vapor.

The exhaust gases can be evacuated to the second exhaust line 7000, as illustrated in FIG. 1, by circulating upstream from the outer downstream end 3420 to the outer upstream end 3410 along an internal volume of the peripheral tube 3400. The upstream circulation of the exhaust gases along the internal volume of the peripheral tube 3400 can provide heat to the working fluid through an outer surface of the peripheral tube 3400 in contact with the working fluid.

In addition, the upstream circulation of the exhaust gases along the peripheral tube 3400 can maintain the ion transport membrane 3150 at high temperatures and enhance the selectivity of the ion transport membrane 3150 and thus make the fire tube boiler system 1000 more efficient.

Preferably, each ion transport membrane 3150 is an elongated tube forming side walls of the first inner tube 3100 and having a diameter in the range of 5 to 50 mm, preferably 10 to 30 mm, more preferably 15 to 20 mm. Furthermore, the elongated tube preferably can have a length in the range of 0.5 to 5 m, more preferably 1 to 4 m, even more preferably 1.5 to 2 m. A wall thickness of the elongated tube may be in the range of 0.5 to 3.5 mm, preferably 0.5 to 2 mm, more preferably 1 to 1.5 mm. Additionally, a surface area of each ion transport membrane 3150 may be in the range of 0.05 m²-5 m², preferably 0.1-4 m², more preferably 0.5-3 m², even more preferably 1-3 m². Accordingly, an oxygen flux of each ion transport membrane 3150 is within the range of 0.01-0.1 mol·m$^{-2}$·s$^{-1}$, preferably 0.01-0.05 mol·m$^{-2}$·s$^{-1}$, more preferably about 0.03 mol·m$^{-2}$·s$^{-1}$ at a temperature in the range of 800-1,500° C., preferably 800-1,200° C., more preferably 800-1,000° C.

The second inner tube 3200 can have a diameter in the range of 10 to 100 mm, preferably 20 to 60 mm, more preferably 30 to 40 mm. Furthermore, the second inner tube 3200 can have a length in the range of 0.5 to 5 m, more preferably 1 to 4 m, even more preferably 1.5 to 2 m.

The peripheral tube 3400 can have a diameter in the range of 20 to 200 mm, preferably 40 to 120 mm, more preferably 60 to 80 mm. Furthermore, the peripheral tube 3400 can have a length in the range of 0.5 to 5 m, more preferably 1 to 4 m, even more preferably 1.5 to 2 m.

In another non-limiting illustrative example, each ion transport membrane 3150 may be in the form a duct with a rectangular cross-section having a cross-sectional area in the range of 0.5 to 15 cm², preferably 1 to 8 cm², more preferably 1 to 3 cm², wherein the length and the wall thickness of the duct is preferably substantially similar to that of the elongated tube.

In a preferred non-limiting illustrative example, each ion transport membrane 3150 can have a compressive strength of at least 50 MPa, preferably at least 100 MPa, more preferably at least 200 MPa, and can be utilized to prevent a collapse due to an excessive pressure in an internal volume of the first inner tube 3100. Each ion transport membrane 3150 may preferably be secured inside the oxygen transport reactor 3000 and/or the vessel 2000 with bolts and nuts, O-rings (e.g. ceramic or metal rings), and/or gaskets to prevent any leakage from the internal volume of the ion transport membrane 3150 to the working fluid and vice versa.

The ion transport membrane 3150, used in the oxygen transport reactor 3000, functions to separate oxygen $O_2$ from air or other oxygen-containing gaseous mixtures by transporting oxide ions (i.e. $O^{2-}$) through a membrane that is capable of conducting oxide ions and electrons at elevated temperatures. When an oxygen partial pressure differential is applied on opposite sides of such a membrane, oxygen molecules ionize on one surface of the membrane and emerge on an opposite side as oxide ions. Then, the oxide ions (i.e. $O^{2-}$) recombine into molecular oxygen on the opposite side, leaving behind free electrons that transport back through the membrane to ionize another oxygen molecule.

Each ion transport membrane 3150 can be a semi-permeable membrane that allows passage of oxide ions (i.e. $O^{2-}$) from the internal volume of the first inner tube 3100 to a combustion volume between the first inner tube 3100 and the second inner tube 3200. The term "semi-permeable membrane" refers to a membrane that allows molecules or ions (in this case oxide ions) with a certain Stokes radius to pass therethrough by diffusion. Stokes radius of a substance in a membrane refers to the radius of a hard sphere that diffuses at the same rate as that substance through the membrane. Diffusion refers to a passage of the oxide ions through the ion transport membrane 3150, and diffusivity is a passage rate of the oxide ions, which is determined by an oxygen partial pressure differential on both sides of the ion transport membrane 3150 as well as a volume fraction (or a number) of oxide ion vacancies present in the ion transport membrane 3150.

Each ion transport membrane 3150 can have a composition with a general formula $A_xA'_{x'}B_yB'_{y'}O_{3-z}$, wherein each of A and A' is selected from the group consisting of Sr, Ba, La, and Ca, and each of B and B' is selected from the group consisting of Fe, Co, Cr, Ti, Nb, Mn, and Ga. Further, each of x, x', y, and y' in the general formula of each ion transport membrane 3150 has a value between 0 and 1, such that x+x'=1 and y+y'=1. Also, z can be a number that varies to maintain electro-neutrality of the ion transport membrane 3150. For example, in some non-limiting illustrative examples, each ion transport membrane 3150 can be a perovskite-type ceramic having a composition of $Ba_uBi_w$-$Co_xFe_yO_{3-\delta}$, $Ba_uCo_wFe_xNb_yO_{3-\delta}$, $Ba_uFe_xNb_yO_{3-\delta}$, $Ba_wCe_xFe_yO_{3-\delta}$, $Ba_uSr_wCO_xFe_yO_{3-\delta}$, $Ba_uTi_wCO_xFe_yO_{3-\delta}$, $Ca_uLa_wFe_xCO_yO_{3-\delta}$, $Sr_uCa_wMn_xFe_yO_{3-\delta}$, $Sr_uCo_wFe_yO_{3-\delta}$, $La_2NiO_{4+\delta}$, $La_wCa_xFe_yO_{3-\delta}$, $La_wCa_xCo_yO_{3-\delta}$, $La_uCa_wFe_x\text{-}Co_yO_{3-\delta}$, $La_wSr_xCo_yO_{3-\delta}$, $La_uSr_wTi_xFe_yO_{3-\delta}$, $La_uSr_w\text{-}Co_xFe_yO_{3-\delta}$, $La_uSr_wGa_xFe_yO_{3-\delta}$, or $12.8La_uSr_wGa_xFe_yO_{3-\delta}\text{—}Ba_uSr_xFe_wCo_xFe_yO_{3-\delta}$, wherein u, v, w, x, and y are each in the range of 0-1, and δ can vary to maintain electro-neutrality. In another non-limiting illustrative example, each ion transport membrane 3150 can be a perovskite-type ceramic having a composition of $La_{1-x}Sr_x\text{-}CoO_{3-\delta}$ with x in the range of 0.1-0.7. In some non-limiting illustrative examples, each ion transport membrane 3150 can be doped with a metallic element selected from the group consisting of Ni, Co, Ti, Zr, and La. Likewise, each ion transport membrane 3150 may be doped with a metallic element selected from the lanthanide group of the periodic table (i.e. metallic chemical elements with atomic numbers 57 through 71). Furthermore, each ion transport membrane 3150 may include a coating layer having a composition of $RBaCO_2O_{5+\delta}$, wherein R can be a metallic element (e.g. rare earth element) selected from the lanthanide group (i.e. elements with atomic numbers 57 through 71) of the periodic table. Preferably, R can be at least one element selected from the group consisting of Pr, Nd, Sm, and Gd. In a preferred non-limiting illustrative example, each ion transport membrane 3150 can include pores in the size range of 0.1-10 nm, preferably 0.5-5 nm, more preferably 0.5-3 nm.

In one alternative non-limiting illustrative example, a selectivity of each ion transport membrane 3150 with respect to oxide ions (i.e. $O^{2-}$) can be at least 90%, preferably at least 95%, more preferably at least 98%. Selectivity of the ion transport membrane 3150 with respect to an ion (e.g. oxide ions) can be a measure of the capability of the ion transport membrane 3150 to transport the ion (e.g. oxide ions) over other substances present in an oxygen-containing gaseous mixture. For example, if selectivity of the ion transport membrane 3150 with respect to oxide ions is 99%, then 99 wt % of permeated substances through the membrane are oxide ions. Selectivity of the ion transport membrane 3150 with respect to oxide ions may be determined by the size of vacancies present in the crystal structure of each ion transport membrane 3150. Oxide ions can form in a reduction reaction when molecular oxygen is contacted with the ion transport membrane 3150 and in the presence of free electrons. Having a 100% selectivity with respect to oxide ions only allows the oxide ions to permeate through the ion transport membrane 3150. In one non-limiting illustrative example, a selectivity of each ion transport membrane 3150 with respect to carbon dioxide $CO_2$, elemental nitrogen (i.e. $N_2$), water $H_2O$ vapor, carbon monoxide, argon, and sulfur is less than 5%, preferably less than 2%, more preferably less than 1%, even more preferably less than 0.5%.

Figure 4A:
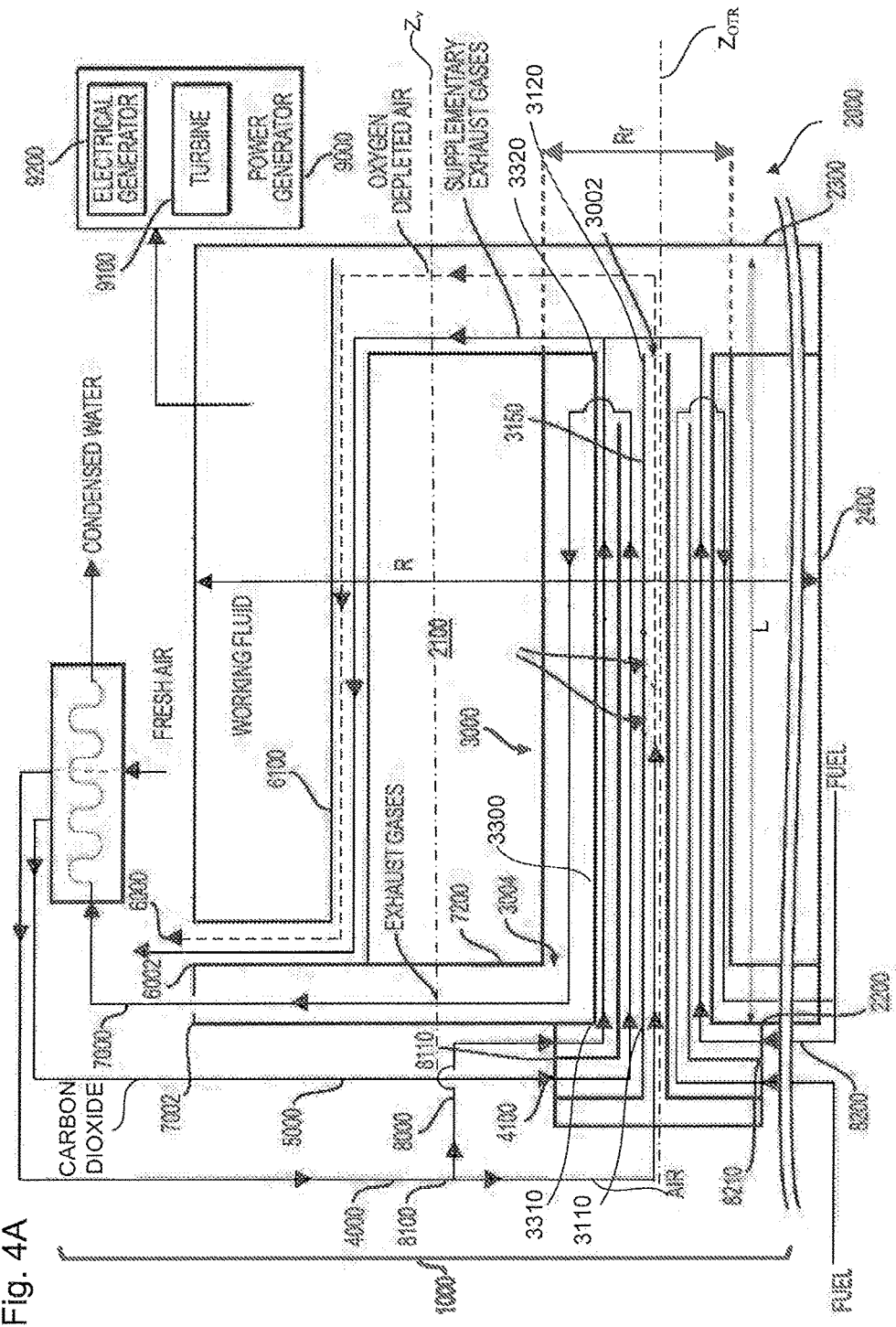
FIG. 4A is a schematic view of the fire tube boiler system in a first supplementary configuration, according to certain aspects of the disclosure.
Figure 4B:
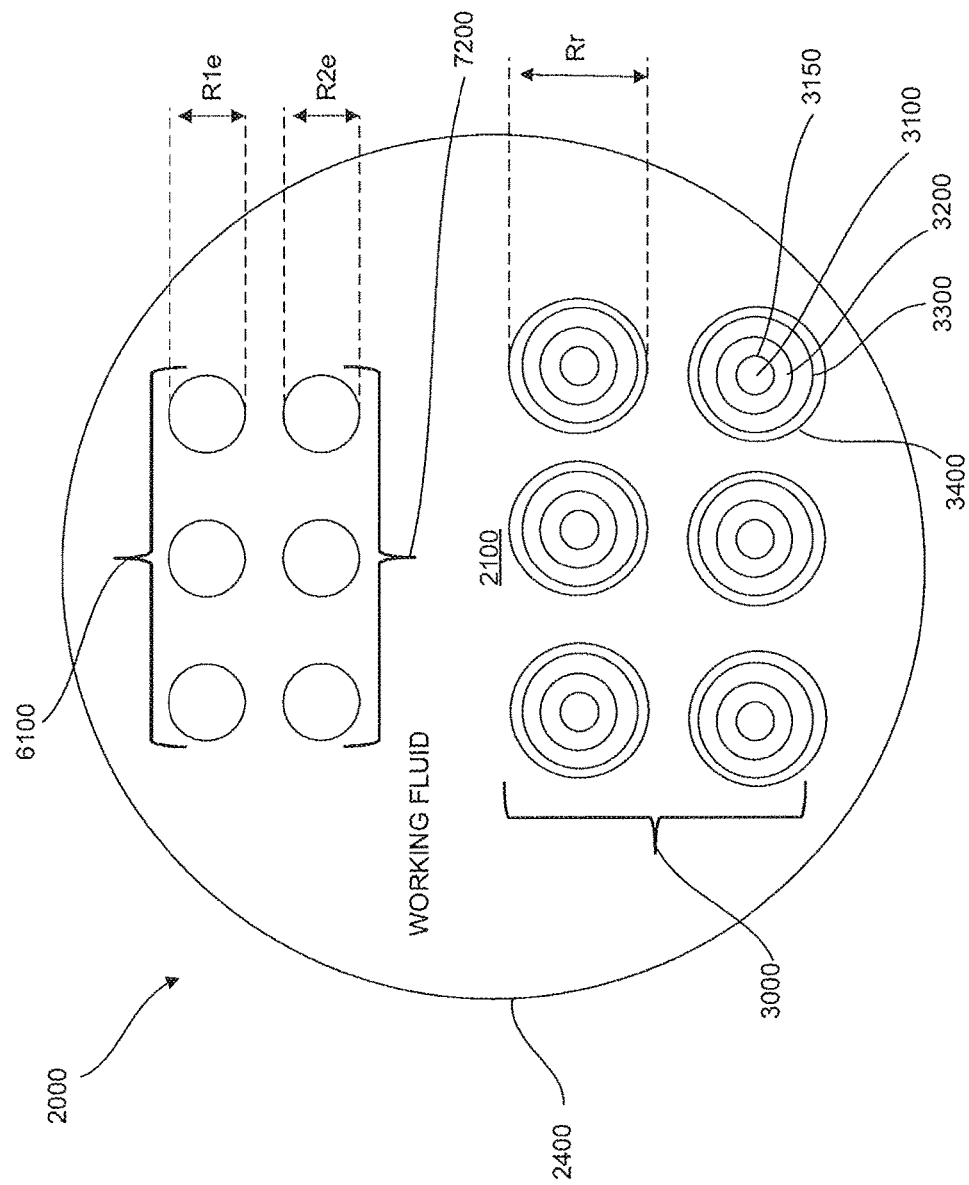
FIG. 4B is a cross sectional view of the vessel of the fire tube boiler system in the first supplementary configuration, according to certain aspects of the disclosure.

FIGS. 4A-4C is a schematic view of the fire tube boiler system 1000 in a first supplementary configuration, a sectional view of the vessel 2000 in the first supplementary configuration, a perspective and sectional views of the oxygen transport reactor 3000 in the first supplementary configuration, according to certain aspects of the disclosure.

In the first supplementary configuration, the fire tube boiler 1000 can also include a third supply line 8000 that supplies a mixture of fuel and air to the plurality of oxygen transport reactors 3000 to generate a supplementary combustion that further heats the ion transport membranes 3150 and enhances the selectivity of the ion transport membranes 3150. Supplementary exhaust gases produced by the supplementary combustion are evacuated by the first exhaust line 6000 at the same time as the oxygen depleted air comes from the first inner tube 3100.

The third supply line 8000 can include a bifurcation 8100 that extracts air from the first supply line 4000 and supplies air to the plurality of oxygen transport reactors 3000 via an additional air supply manifold 8110, and an independent fuel supply line 8200 that supplies fuel to the plurality of oxygen transport reactors 3000 via an additional fuel supply manifold 8210.

In addition in the first supplementary configuration, each oxygen transport reactor of the plurality of oxygen transport reactors 3000 can also include a third inner tube 3300 positioned between the second inner tube 3200 and the peripheral tube 3400, as illustrated in FIGS. 4B-4C, to receive the mixture of air and fuel supplied by the third supply line 8000 and generate the supplementary combustion between the second inner tube 3200 and the peripheral tube 3400.

The third inner tube 3300 can surround the second inner tube 3200 and the ion transport membrane 3150, and run along a longitudinal length of the oxygen transport reactor 3000. In addition, the third inner tube 3300 can include a third upstream end 3310 opened on the third supply line 8000, as illustrated in FIG. 4A, and a third downstream end 3320 opened on a respective first exhaust duct of the plurality of the first exhaust ducts 6100 to evacuate the supplementary exhaust gases through the first exhaust line 6000.

The third upstream end 3310 of the third inner tube 3300 can be aligned with the first upstream end 3110 of the first inner tube 3100 and the third downstream end 3320 can be aligned with the first downstream end 3120 of the first inner tube 3100.

The third inner tube 3300 can have a diameter in the range of 20 to 200 mm, preferably 40 to 120 mm, more preferably 60 to 80 mm. Furthermore, the third inner tube 3300 can have a length in the range of 0.5 to 5 m, more preferably 1 to 4 m, even more preferably 1.5 to 2 m.

Accordingly in the first supplementary configuration, the peripheral tube 3400 can have a diameter in the range of 40 to 400 mm, preferably 80 to 240 mm, more preferably 120 to 160 mm. Furthermore, the peripheral tube 3400 can have a length in the range of 0.5 to 5 m, more preferably 1 to 4 m, even more preferably 1.5 to 2 m.

Figure 5A:
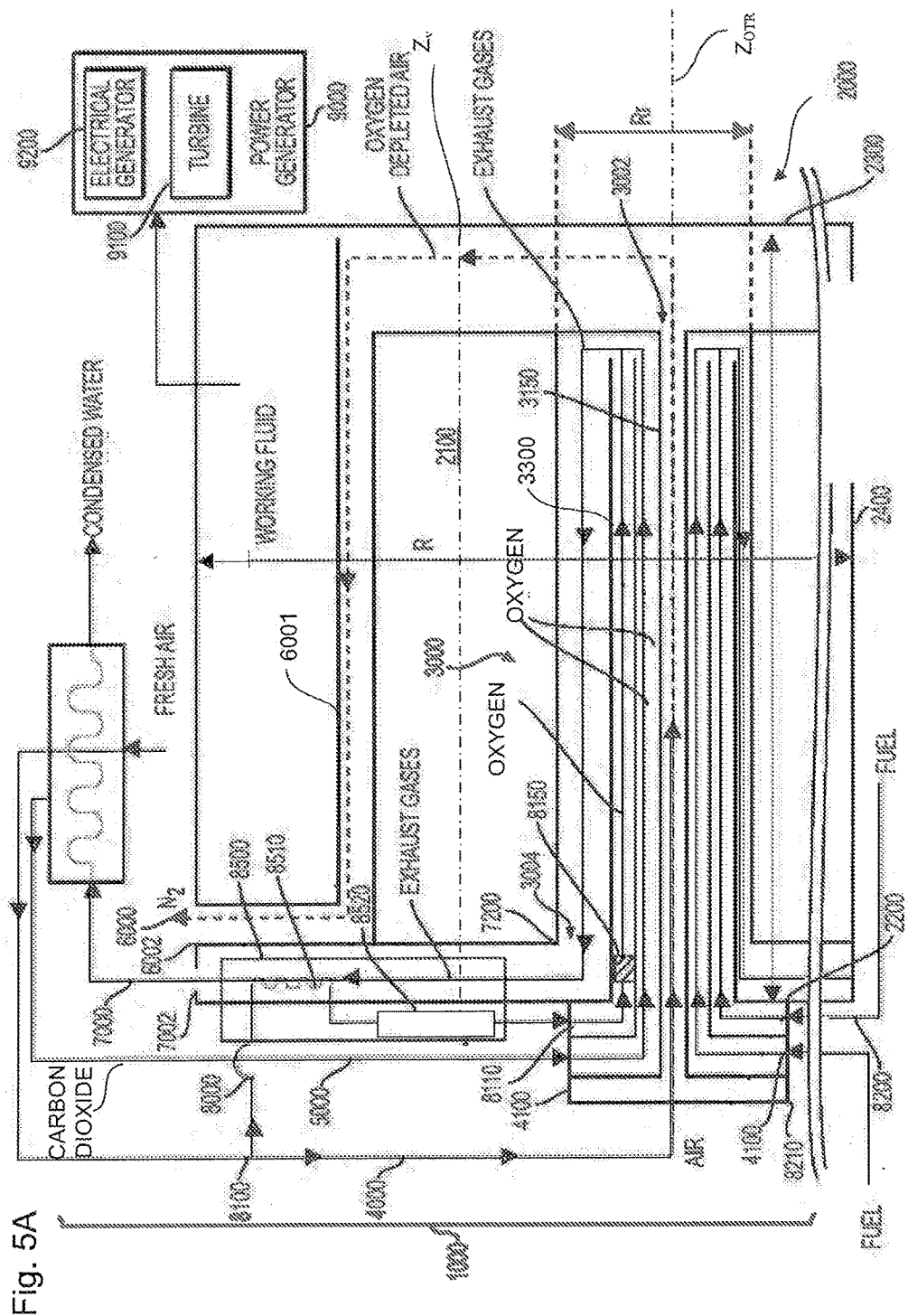
FIG. 5A is a schematic view of the fire tube boiler system in a second supplementary configuration, according to certain aspects of the disclosure.
Figure 5B:
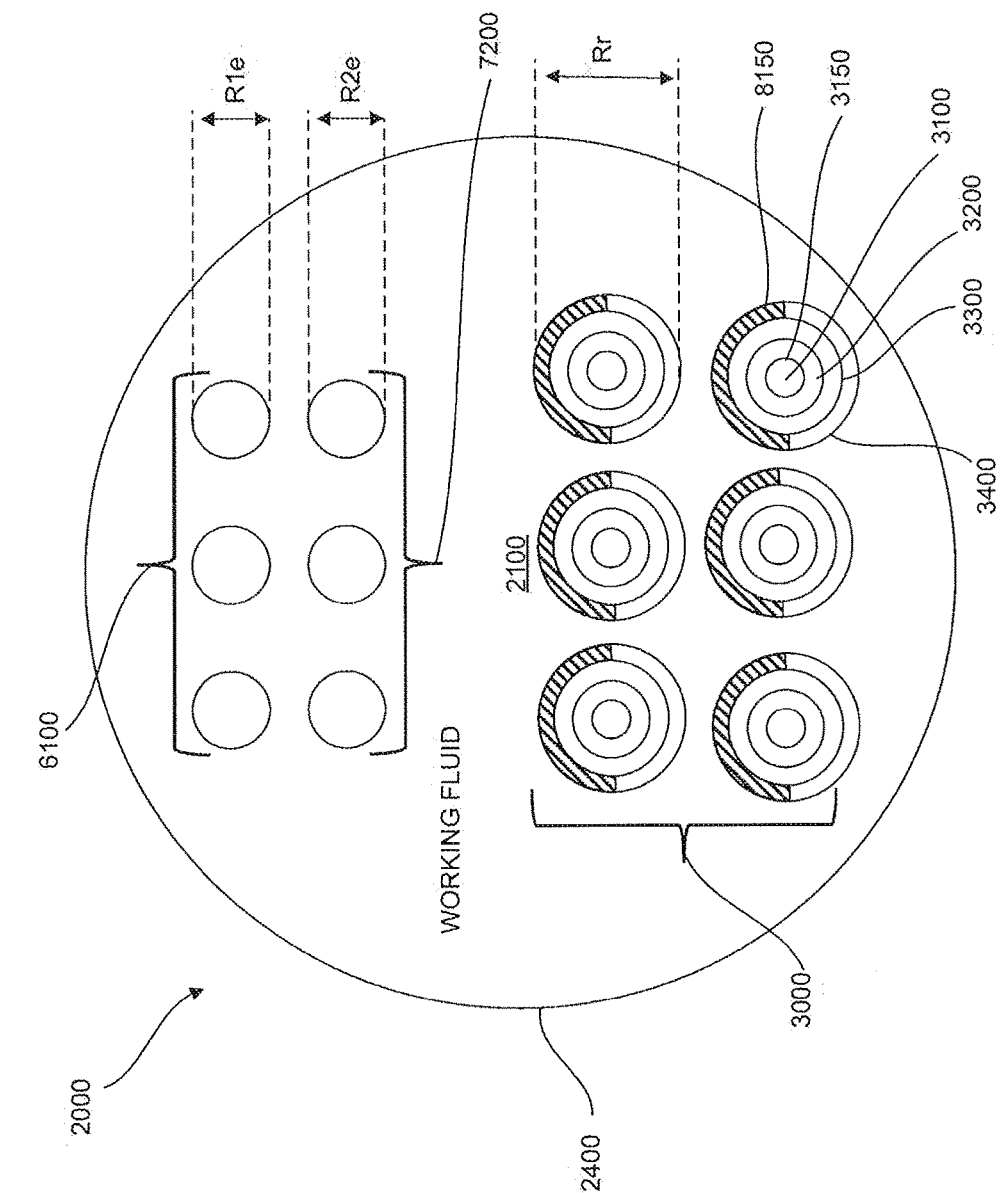
FIG. 5B is a cross sectional view of the vessel of the fire tube boiler system in the second supplementary configuration, according to certain aspects of the disclosure.
Figure 5C:
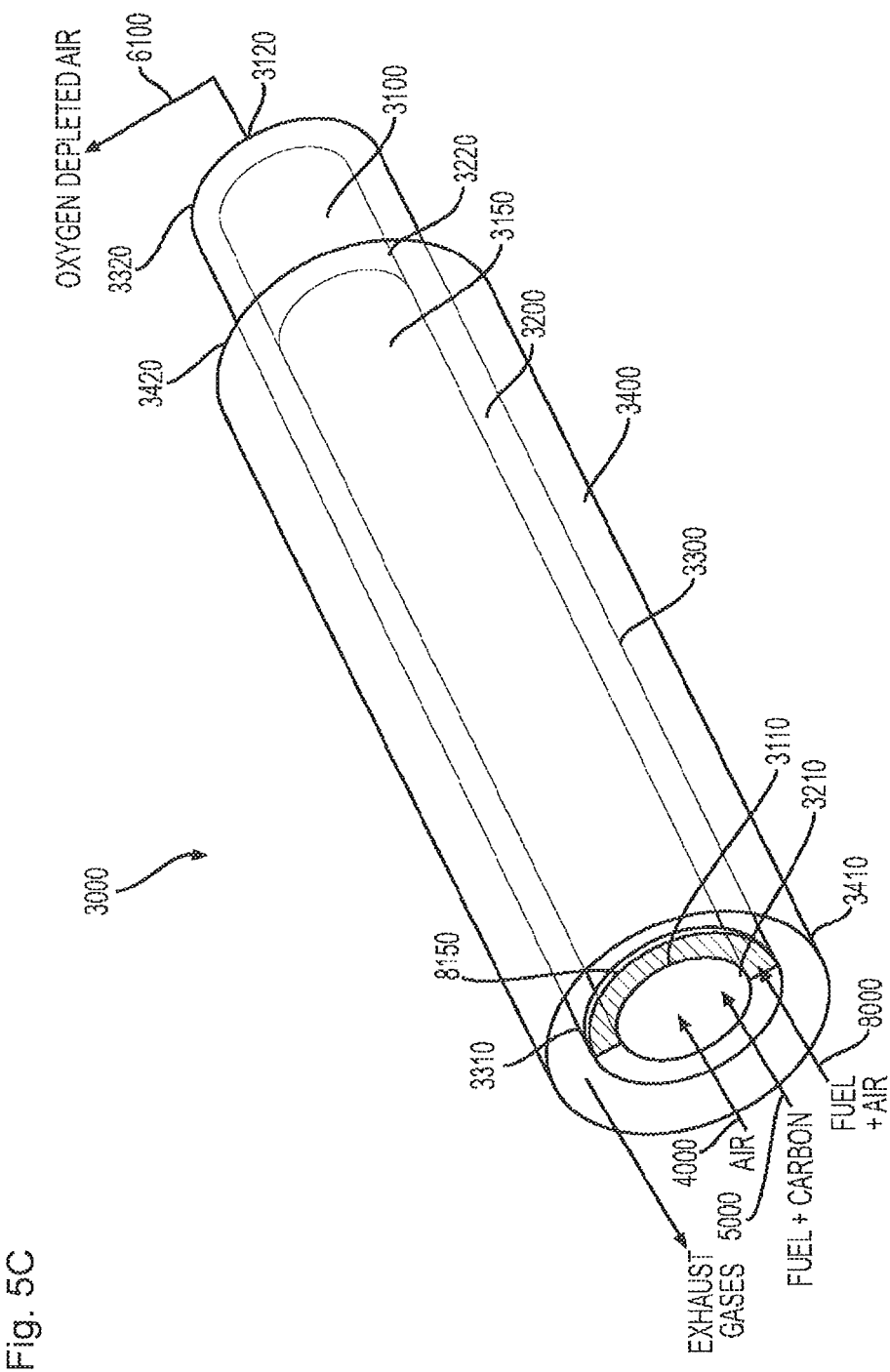
FIG. 5C is a perspective view of an oxygen transport reactor of the fire tube boiler system in the second supplementary configuration, according to certain aspects of the disclosure.

FIGS. 5A-5C are schematic views of the fire tube boiler system 1000 in a second supplementary configuration, a sectional view of the vessel 2000 in the second supplementary configuration, a perspective and sectional views of the oxygen transport reactor 3000 in the second supplementary configuration, according to certain aspects of the disclosure.

In the second supplementary configuration, the fire tube boiler 1000 can also include a supplementary ion transport membrane 8150 positioned on the additional air supply manifold 8110, and an air heating system 8500 on the third supply line 8000 to heat air arriving from the third supply line 8000 and provide heated air to the supplementary ion transport membrane 8150.

The heated air can go through the supplementary ion transport membrane 8150 to extract oxygen $O_2$ and provide to the third inner tube 3300 a mixture of oxygen and fuel, e.g. $O_2+CH_4$. Inside the third inner tube 3300 the mixture of oxygen and fuel generates a supplementary oxy-combustion that result in supplementary exhaust gases. The supplementary exhaust gases are then evacuated through the second exhaust line 7000 with the exhaust gases from the oxy-combustion occurring in the second inner tube 3200.

The supplementary oxy-combustion can provide heat to the ion transport membranes 3150 inside the first inner tubes 3100 to enhance oxygen selectivity from the first inner tube 3100 to the second inner tube 3200. In addition, the supplementary exhaust gases produced by the supplementary oxy-combustion contain only water $H_2O$ vapor and carbon dioxide $CO_2$ which can be captured and/or reinjected into the fire boiler system 1000 via the condenser 7100 of the second exhaust line 7000 and the second supply line 5000.

The supplementary ion transport membrane 8150 can be planar in shape, a half-disk or a half-annulus, can be positioned on the third supply line 8000 downstream from the air heating system 8500, on an entrance of the additional air supply manifold 8110, and/or on a partial portion of the third upstream end 3310 of the third inner tube 3300 to only be in contact with the air and not the fuel, as illustrated in FIGS. 5B-5C.

The air heating system 8500 can include a gas-gas heat exchanger 8510 placed in the vessel 2000 and in contact with the exhaust gases, and an auxiliary heater 8520 that can use an external power source, e.g. electricity, to further heat the air arriving from the third supply line 8000 and to enhance oxygen selectivity performed by the supplementary ion transport membrane 8150.

For example, the gas-gas heat exchanger 8510 and the auxiliary heater 8520 can be elaborated to produce a total heating capacity in the range of 20,000 to 1,000,000 Btu/hr, preferably 50,000 to 750,000 Btu/hr, and more preferably 100,000 to 500,000 Btu/hr.

The second inner tube 3200, the third inner tube 3300, and the peripheral tube 3400 can be elaborated to withstand high temperatures and pressures, preferably, at temperatures in the range of 800-2500° C., more preferably 1000-2200° C., even more preferably 1200-2000° C., and pressures in the range of 1-10 bars, preferably 1-5 bars, more preferably 1-2 bars.

The second inner tube 3200, the third inner tube 3300, and the peripheral tube 3400 can be made of a metal or an alloy such as stainless steel, nickel steel, chromium steel, aluminum, aluminum alloy, copper and copper alloys, titanium, and the like, and interior surfaces of the second inner tube 3200, the third inner tube 3300, and the peripheral tube 3400 may be coated with an oxidation resistant layer to minimize internal surface oxidation. For example, the interior surfaces of the second inner tube 3200, the third inner tube 3300, and the peripheral tube 3400 may be coated with the high-temperature duty ceramic composite, quartz, alumina, Pyrex®, and the like. Although the materials used to construct the vessel 2000 are not meant to be limiting and various other materials may also be used.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

The invention claimed is:

1. A counterflow tube boiler system comprising:
a vessel that contains a working fluid;
a plurality of oxygen transport reactors that is positioned inside the vessel and that heats the working fluid;
a first supply line that provides air to the plurality of oxygen transport reactors;
a second supply line that provides a mixture of fuel and carbon dioxide to the plurality of oxygen transport reactors;
a first exhaust line that evacuates oxygen depleted air from the plurality of oxygen transport reactors; and
a second exhaust line that evacuates exhaust gases from the plurality of oxygen transport reactors,
wherein
each oxygen transport reactor of the plurality of oxygen transport reactors includes:
a first inner tube having:
an upstream end that connects the first supply line to receive the air,
a downstream end that connects the first exhaust line to evacuate the oxygen depleted air, and
an ion transport membrane that connects the upstream end with the downstream end to extract oxygen from the air and form the oxygen depleted air;
a second inner tube that surrounds the first inner tube to receive the oxygen from the ion transport membrane and that connects the second supply line to receive the mixture of fuel and carbon dioxide to react with the oxygen in a oxy-combustion; and
a peripheral tube that surrounds the second inner tube and seals the second inner tube around the first inner tube at a downstream end and directs the exhaust gases in a countercurrent direction of flow with respect to the direction of flow of the air in the first supply line and the mixture of fuel and carbon dioxide in the second supply line,
wherein the peripheral tube connects the second exhaust line through an upstream end to evacuate the exhaust gases produced by the oxy-combustion and transfer heat from exhaust gases to the working fluid and the ion transport membrane.

2. The counterflow tube boiler system of claim 1 further including a condenser between the second exhaust line and the second supply line to condensate water contained in the exhaust gases and extract carbon dioxide.

3. The counterflow tube boiler system of claim 2 wherein the condenser is connected to the second supply line to provide carbon dioxide to the mixture of fuel and carbon dioxide.

4. The counterflow tube boiler system of claim 1, wherein the first inner tube, the second inner tube, and the peripheral tube are positioned concentrically and have a cylindrical shape.

5. The counterflow tube boiler system of claim 1, wherein the vessel further includes a plurality of first exhaust ducts that connects the first inner tube to the first exhaust line to evacuate the oxygen depleted air and transfer heat from the oxygen depleted air to the working fluid.

6. The counterflow tube boiler system of claim 1, wherein the vessel further includes a plurality of second exhaust ducts that connects the peripheral tube to the second exhaust line to evacuate the exhaust gases and further transfer heat from the exhaust gases to the working fluid.

* * * * *